ELECTRONIC DEVICE AND METHOD FOR TESTING AND TEACHING
Filed Dec. 6, 1962 2 Sheets-Sheet 1
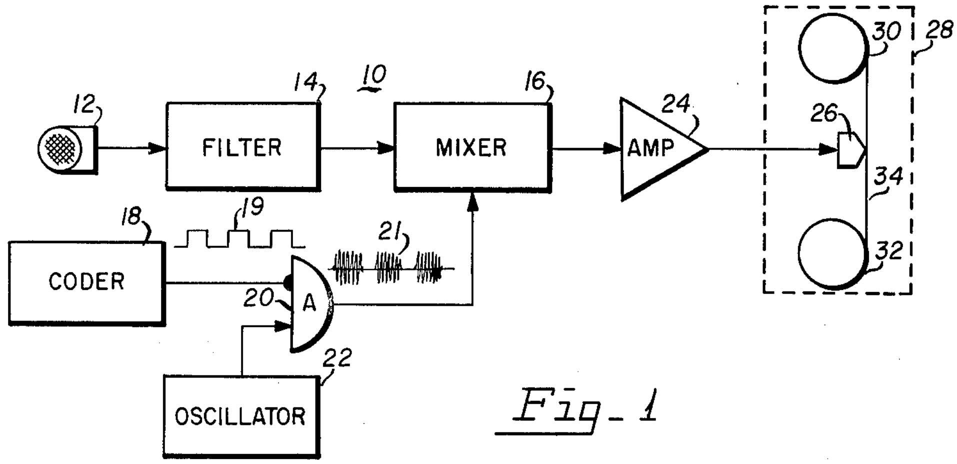
Fig_1
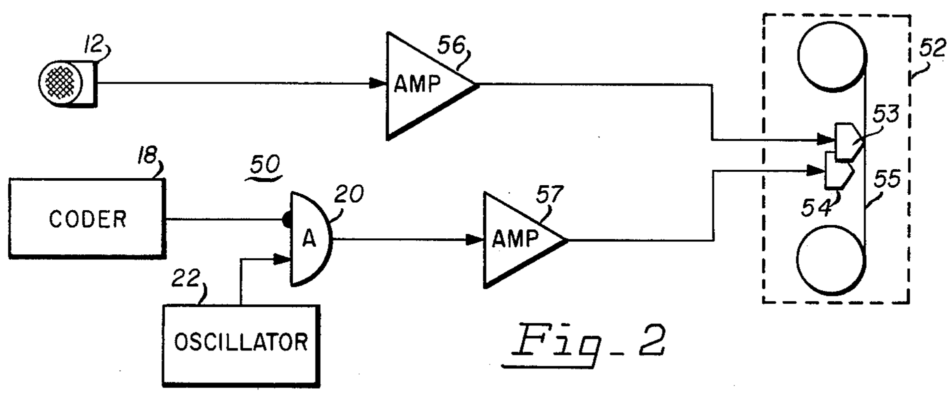
Fig_2
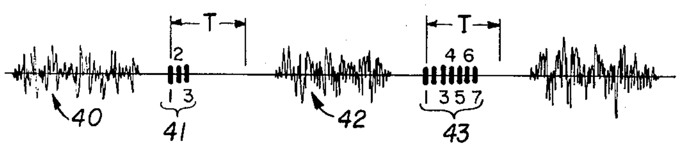
Fig_4A
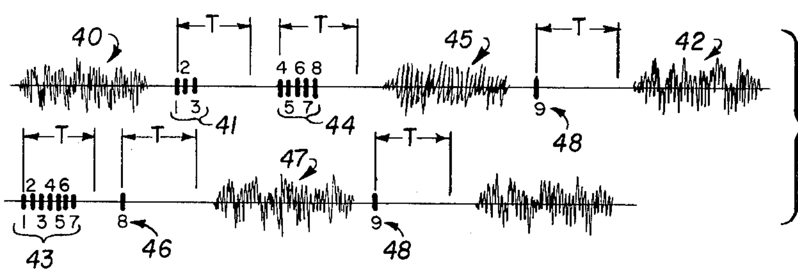
Fig_4B
INVENTORS
JAMES A. TILLOTSON, III
JEROME C. MEYER
BY
Harvey J. Lambert
ATTORNEY ELECTRONIC DEVICE AND METHOD FOR TESTING AND TEACHING
Filed Dec. 6, 1962 2 Sheets-Sheet 2
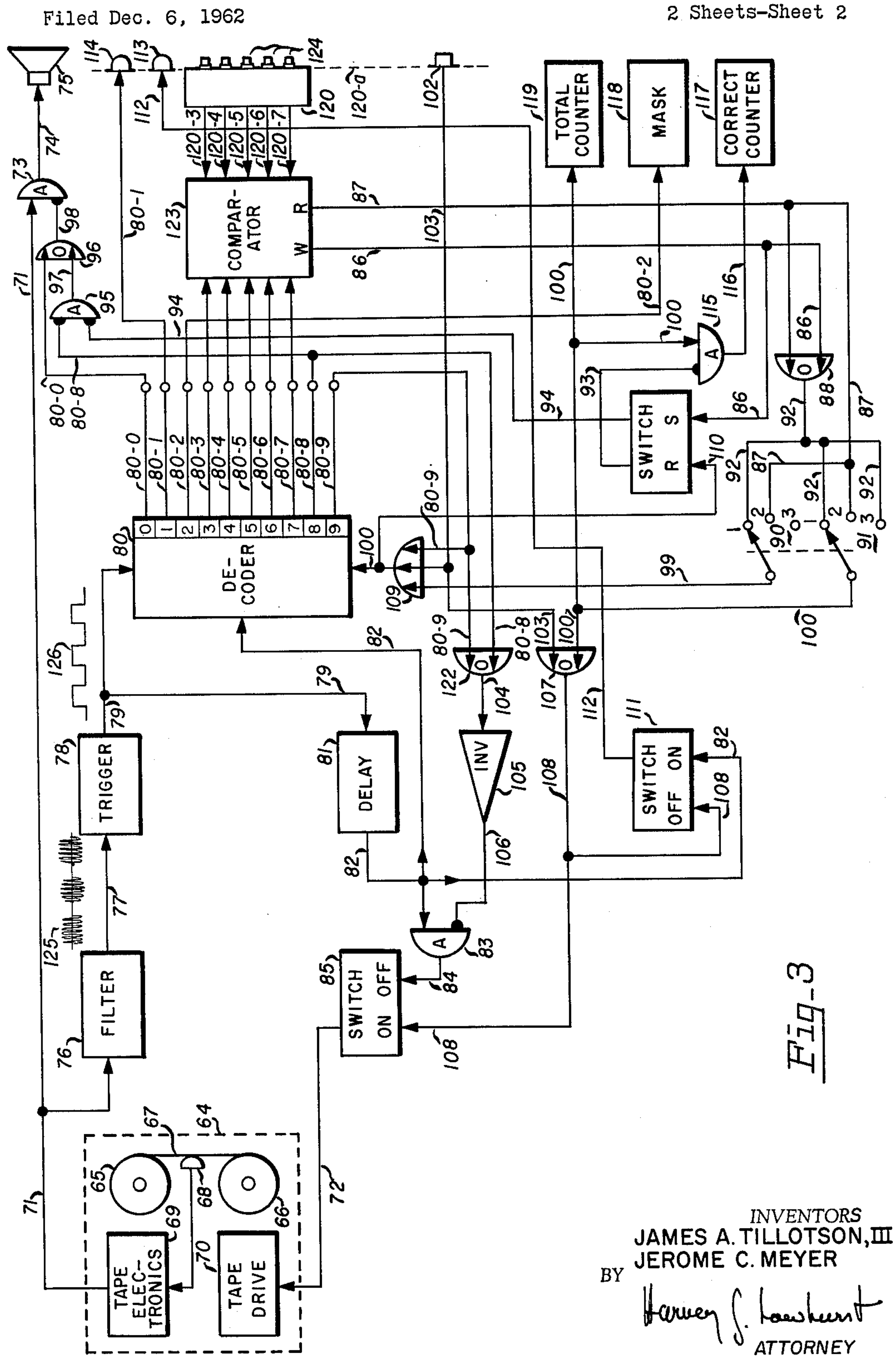
Fig_3
INVENTORS
JAMES A. TILLOTSON, III
JEROME C. MEYER
BY Harvey C. Lowhurst
ATTORNEY United States Patent Office 3,210,864
Patented Oct. 12, 1965

3,210,864
ELECTRONIC DEVICE AND METHOD FOR TESTING AND TEACHING

James A. Tillotson III, Menlo Park, Calif. (1415 Ben Roe Ave., Los Altos, Calif.), and Jerome C. Meyer, 1512 Ben Roe Ave., Los Altos, Calif.

Filed Dec. 6, 1962, Ser. No. 242,706
32 Claims. (Cl. 35—9)

This invention relates to electronic devices and a method for the testing and teaching of persons, and more particularly to a device for: electronically recording a selected testing or teaching program including questions together with coded answers to the questions; electronically reproducing the testing or teaching program for audible or pictorial reception by a person to be tested or taught who is provided with multiple choice answers, and means for selecting one of the answers to a given question and for coding the selected answer for reception by the device; and comparing the coded answer given by the person under test or training with the answer coded during recording of the program and for following a selected program in accordance with the result of such comparison.

With increasing specialization in business, in industry, and in education, the need for individual testing and particularly training of employees, customers, students and the like becomes increasingly more important. Heretofore the testing and training of such persons, whether they be employees, applicants, trainees or students, required a training staff to repetitiously teach the same instructional material to individual after individual and group after group. As the field of industrial and educational specialization becomes more narrow and the number of persons required for the various specialities becomes larger, the cost of testing and training by trained personnel has sharply risen and trained personnel to perform such tasks have become increasingly more difficult to find.

For example, one of the incidents to the sale of a complicated new product, such as for example a new office calculator, is the problem of training the customers in the proper operation, use, and maintenance thereof. Heretofore, industry had to provide such customer training by organizing a special field service staff which is, of course, very costly to maintain. Furthermore, unless such a field service staff is overstaffed, a member of this special department may not be immediately available to train or service a customer upon short notice, resulting in dissatisfaction of the customer. The electronic testing and teaching device of this invention makes it possible to test and train the customer by use of special programs carefully tailored to their needs, without the need of human instructors.

Also, for the hiring of employees in connection with the performance of specified jobs or for the operation of specified machines, it has been necessary heretofore for industry to maintain a staff of highly trained interviewers. No matter how competent and highly trained these interviewers were, they could hardly be expected to have an intimate knowledge of the performance of each job or the operation of each machine for which they were to hire personnel. Accordingly, personnel can and are today often hired without an adequate test of their qualifications for the job. As a result thereof there has been instances in which employees not competently trained were hired with the resulting increase of overhead and decrease of overall efficiency. And even in the case of attempting highly selective hiring by specialized interviewers, the cost of maintaining such interviewers, particularly for smaller industrial concerns, is often prohibitive or unrealistic.

The above two examples, selected at random from many others which are common occurrences in today's industry, clearly show the need for accurate, foolproof and automatic machines for testing and training individuals utilizing highly specialized programs carefully selected for the skills to be tested or taught. In this manner a specialist in the particular skill to be programmed for testing or teaching may assist the training personnel in the preparation of such specialized programs.

In certain instances, very specialized programs may be required in a particular industry so that provisions to prepare one's own programs are desirable. Of the utmost importance is therefore the requirement that programs be simple to prepare and easy to modify. Whether or not the program is bought or made by one's own staff, such programs should be reusable over and over again and the devices which use these programs for individual testing and teaching should be fully automatic and either test or teach for specialized skills or general knowledge. Further, such devices should provide an output which gives test or teaching scores so that the qualifications or degree of proficiency can be measured, and if necessary, fully evaluated.

Electronic testing and teaching machines attempting to solve the above indicated problems have appeared heretofore from time to time but each one has been found wanting in some respects. Certain of the prior art machines were capable of performing only the testing function and this only with the aid of pencil and paper. Other prior art machines of the electronic type for individual operation were not foolproof and permitted tampering with the results after a person had completed a program. Still other electronic testing and teaching machines have been found of very limited application in that the method of testing or teaching was not sufficiently rigidly programmed to actually test or train a person. None of the prior art attempts of providing a testing or teaching machine have solved the problem of fully automating the same so that no individual need be in attendance or that answers are immediately and electronically checked and recorded.

It is therefore a primary object of this invention to provide a fully automatic device for the testing and training of persons in any field whether it be commercial, industrial, or educational.

It is another object of this invention to provide a fully automatic device capable of training employees for specified jobs without the need for a trained individual in attendance.

It is a further object of this invention to provide a foolproof, electronic fully automatic device of the testing and teaching type having several modes of operation whereby persons may be either tested or trained or both in accordance with a preselected and changeable program.

It is also an object of this invention to provide a teaching device which is very simple to program so that "in-house" programs can be prepared at minimum cost.

It is still another object of this invention to provide a testing and training device which readily accepts selected test or instructional material for playback to a person under test or training who is forced to respond to each individual question of the material propounded before the device will advance to the next question. Additionally, the device is desired to have selected modes of operation and either advances to the next question independent of whether the correct response was received, or requires a correct response prior to advancing, or responds to a wrong response by automatically providing additional or reinforcing material pointing to what the proper response should have been before advancing to the next question.

It is a still further object of this invention to provide testing and training devices which compute the sum total of the correct responses and the total responses without giving any indication of the score to the person under test or training.

It is also an object of this invention to provide a testing and teaching machine for use with a recorded program which can be repeated numerous times and which may be used in connection with an answer booklet or other visual devices such as slides, films and the like for displaying multiple choice answers, which are also capable of many repeated uses.

It is also an object of this invention to provide a device of the testing and teaching type which is fully automatic, economical, foolproof and capable of testing and teaching in accordance with exchangeable duplicating and storable programs which can be developed by experts for repeated use.

It is also a still further object of this invention to provide a device of the testing and teaching type which utilizes a recorded program including coded answers and control signals superimposed on the audio storage means.

Briefly, in the preferred embodiment of this invention, questions are voice recorded on a magnetic tape or any other suitable record storage means, each followed by a pulse coded number which represents the number of the correct answer of numbered multiple choice answers shown the person under test or training. The recorded tape, which is the testing or teaching program, is played back for audible reproduction of the question by a magnetic playback device which is constructed to stop after each question and to wait for the person to select an answer from the multiple choice answer shown him. The device also detects, decodes and stores the correct pulse coded answer.

A coder is provided in the form of a response panel which is actuated by the person under test or training and which is compared with the stored answer. In accordance with the particular mode of operation desired, the device of this invention first records whether or not the person selected the right answer and thereafter either advances to the next question, or gives the person a second choice to select the correct answer, or supplies the person with additional informative material so he can learn the correct answer. For the last mode of operation, such illustrative material is voice recorded on the magnetic tape after the coded answer and the device is provided with means of advancing the tape to reproduce such material in case a wrong answer is given and to omit such material in case the correct answer is given.

Other objects and a better understanding of the invention may be had by reference to the following description, taken in conjunction with the accompanying drawings, in which:

FIG. 1 is a schematic system diagram of the recorder portion of the testing and training device of this invention;

FIG. 2 is a schematic system diagram of an alternate embodiment of the recorder portion of this invention utilizing a dual track magnetic head;

FIG. 3 is a schematic system diagram showing the playback and the general control system of the testing and teaching device of this invention; and FIGS. 4*a* and 4*b* are wave form diagrams illustrating the recorded question and the code utilized in operating the device of this invention in several training modes.

In order to more fully understand the ensuing detailed description of the drawing and particularly the method employed in testing and teaching humans in accordance with this invention, the following general discussion of the nature of the testing and teaching program and the response expected of the person being tested and trained, as well as the coding scheme and various methods of operation, is now offered.

Generally speaking, the preferred method of testing and teaching a person in accordance with this invention comprises asking the person a question, registering the answer and taking some action in accordance with the answer registered. The person is asked the question either audibly, such as for example through a loud speaker, or visually such as, for example, by means of a television screen or slide or movie projector. In other applications of interrogating, the question might comprise a combination of both vision and sound, such as may be accomplished by a motion picture with a sound track. In any event, the person to be tested or instructed is interrogated with questions which are sequentially numbered and which may be preceded by a lecture in case the primary purpose, to which the device of this invention is put, is to teach.

The person to be tested or trained is also provided with a set of multiple choice answers, usually printed on paper sheets or cards, which are keyed to the numbered questions he is asked. Instead of printing, the answer may, of course, be projected for viewing or may be audibly presented for listening. In the simplest embodiment of the device of this invention, the person is simply handed a sheet of paper with carefully numbered sets of multiple choice answers from which he selects the one that he thinks is the correct one. Each set of multiple choice answers in addition to being keyed to a question, has a number or letter assigned to it so that selection of the answer may be made by such letter or number.

Preferably, the question is not printed on the multiple choice answer sheet since in certain test programs information may be gleaned by the person if he has all the questions and answers before him. It has been found that more objective testing and teaching results when the student has only one question before him at a time and has no knowledge of future questions. Past questions, in a testing or teaching program of this nature, are soon forgotten so that practically speaking, the person being tested or trained is confronted only with the single question placed before him. And in any case, if the object is to teach, it may be beneficial for the student to exercise recall since this act of concentration on the subject matter results in learning.

There is a further reason why questions should not be written down and be followed by the multiple choice answers. In certain teaching applications of the device of this invention, the person is first given instructional material which he is to learn. If he has the question later to be asked in front of him at the time that he listens to the instruction material, it is quite possible that he might mark off the proper answers given in the instructional material and is thereby able to evade a fair and objective test of the material presented to him. It must be remembered that one of the objects of this invention is to provide a fully automatic and foolproof device which requires no supervision and in which the student is initially issued all material necessary for receiving training or for taking tests. There will be no necessity for a proctor to watch over him to assure that the does not cheat.

The embodiment of the invention to be describe hereinafter utilizes up to a choice of five different answers to each question. By way of example, the device of this invention might first give a short lecture on history to the person and thereafter interrogate him as follows: "Question No. 3 is: Who was the first President of the United States?" On his answer sheet under Question No. 3 he might be confronted with the following choice: (*a*) George Washington, (*b*) Dwight Eisenhower, (*c*) Franklin D. Roosevelt, (*d*) Herbert Hoover, (*e*) Calvin Coolidge. For these five answers he must make his choice and push an appropriate button from five buttons lettered *a*, *b*, *c*, *d*, *e*, before the device proceeds to the next question.

If the student pushes or depresses the right button, that is, gives the correct answer, the teaching and testing device of this invention will automatically advance to the next question, announce or depict the same in a suitable manner and indicate that it requires an answer. In this manner the test or training proceeds until completed. However, if the student depresses the wrong button, i.e., gives an incorrect answer, the device of this invention may be set initially to operate in one of three different modes of response to an incorrect answer depending on the primary purpose for which the device is to be used. The three modes of operation will be respectively referred to as the Test Mode, Teach Mode No. 1, and Teach Mode No. 2.

In the Teach Mode, the device of this invention is so arranged that every time an answer is made, and regardless of whether the answer is right or wrong, the device proceeds to the next question immediately. The device is also provided with a correct counter, preferably hidden under a releasable mask to prevent the person being tested from learning his score. Every time the person being tested gives a correct answer, the correct counter is advanced and every time an incorrect answer is given the correct counter remains stationary. In this manner the person to be tested has no knowledge of how well he is doing. This mode may also be utilized to teach a student by preceding the next question with a statement of the correct answer. Also, there may be provided a total counter which advances every time a question is asked and gives the student an opportunity to check which question he is on.

The Teach Mode No. 1 differs from the Test Mode in that the next question is only asked after a correct answer is made by the person being taught. In this manner the person being trained will know which one is the correct answer since only the correct answer will advance the program to the next question. As in the Test Mode, the total counter advances every time a question is asked and the correct counter is so set that it is advanced only if the person being taught choses the correct answer on his first selection.

In the Teach Mode No. 2 the device of this invention continues from question to question regardless of whether the answer selected by the person being taught is wrong or right. However, if the person has given an incorrect answer, special reinforcing material is given to the student carefully explaining to him what answers he should have made and why. Such reinforcing material may be a statement such as: "It was George Washington. Remember he was the country's primary leader after the American Revolution ended in 1782. He presided at the Constitutional Convention in 1787 and was elected President by an unanimous vote of the electoral college in 1789." In case the student selected the correct answer, the reinforcing material is omitted and the correct counter advances. The total counter advances each time a question is asked, the same as in the previous two modes.

Referring now to the drawing, and particularly to FIG. 1 thereof, there is shown a preferred embodiment of the portion of the device of this invention for recording the testing or teaching program upon a record member such as magnetic tape. This recording portion, indicated generally as 10, comprises a microphone 12 connected through a suitable filter 14 to a conventional mixer 16. Filter 14 may either be a band-elimination filter constructed to eliminate a narrow band of audio frequencies centered about a selected code oscillator signal frequency or a low-pass filter having a cut-off frequency just below the selected code oscillator signal frequency.

There is also provided a coder 18 which upon being actuated generates a selected number of substantially uniformly spaced, rectangular output pulses as generally indicated at 19. Coder 18 may take the form of either a conventional telephone dialer capable of selectively providing anywhere from a single to ten or more consecutive, equally spaced output pulses or a conventional serial digital pulse coder such as a shift register or the like.

As will be explained hereinafter, the function of coder 18 is to provide a selected number of short, uniformly spaced output pulses, the maximum number in the embodiment to be described being nine. As will also become more clearly understood in the ensuing description, instead of using a code of nine it is likewise within the contemplation of this invention of using lower or higher code numbers, should the need for reduced or additional programming arise. Output pulses 19 from coder 18 are applied, as the enabling signal, to a conventional AND gate 20 for gating the output signal from a code oscillator 22.

The frequency of the signal provided by code oscillator 22 is intimately related to filter 14 as has already been stated. In fact, filter 14 is constructed to eliminate from the audio signal, generated by microphone 12, a narrow frequency band centered about the frequency of code oscillator 22.

The gated code oscillator signal passed by AND gate 20 is also applied to mixer 16 so that the output of mixer 16 comprises the audio signal from microphone 12 from which a narrow frequency band, centered about the code oscillator frequency, has been eliminated by filter 14 and the code oscillator signal suitably gated by AND circuit 20. This signal is also referred to as the composite signal being made up of a filtered audio signal and a gated code oscillator signal.

The composite signal is suitably amplified by amplifier 24 and applied to a magnetic recording head 26 of a tape recorder 28. Tape recorder 28 may be of conventional design including, in addition to magnetic head 26, a tape supply reel 30 and a tape takeup reel 32 for storing a magnetic recording medium such as a tape 34, and suitable tape drive means for driving tape 34 at a constant speed past magnetic head 26.

In recording a testing or teaching program upon a tape by means of recording portion 10, a distinction must be made between the Test Mode and Teach Mode No. 1 on the one hand, and the Teach Mode No. 2 on the other hand. Supposing the program to be recorded relates to the general knowledge of a person in history and question No. 3 of the program relates to the identity of the first President of the U.S. The person preparing the program will then speak into microphone 12 and say "Question No. 3 is: Who was the first President of the United States?" This question is recorded upon tape 34 and shows up as a recorded audio signal as shown at 40, FIG. 4A. Of course, signal 40 excludes the audio frequencies eliminated by filter 14 but since such eliminated frequencies fall within a rather narrow band there will not be a noticeable deterioration of the signal and the reproducible characteristics of audio signal 40 are not material affected. After the end of the question, the person preparing the recorded program actuates coder 18 to provide a selected number of code pulses, such as 19, which enable AND gate 20 to permit gated code oscillator signals to be passed, via mixer 16, to tape 34.

For reasons which will become better understood in connection with the explanation of the portion of the device shown in FIG. 3, the five possible answers to any question, that is *a*, *b*, *c*, *d*, and *e*, are respectively coded by three, four, five, six and seven successive code pulses. Since the correct answer to Question No. 3 is answer *a* the preparer of the program will actuate coder 18 in such a manner that the same provides three successive pulses as shown at 19. These pulses open AND gate 20 to pass these gated code oscillator signals to mixer 16 and to tape 34. These three code pulses appear on on tape 34 as is shown at 41, FIG. 4A.

Selection of the proper code oscillator frequency depends, to some extent, on the quality of the recorder. For example, for inexpensive recorders, which do not have very high fidelity, a relatively low code oscillator frequency is desired since otherwise the roll-off is too great. Also, to achieve the greatest economy in the use of tape, a low tape speed is desired which again decreases the fidelity of the output signal so that a low oscillator frequency is best. As a practical matter a code oscillator frequency of 3,600 cycles per second has been found eminently satisfactory with a tape speed of 3¾ inches per second. Accordingly, filter 14 is designed in such a manner that it does not pass frequencies of 3600 cycles per second. Good results have been provided with a filter, either band pass or low pass, which provides an attenuation of 20 db at the code oscillator frequency.

After recording three successive code pulses to signify that the first of the five multiple choice answers is the correct one, the next question, Question No. 4, is recorded as shown at 42, FIG. 4A, together with the gated code oscillator signal which is illustrated as seven consecutive pulses at 43, indicating that answer *e* is the correct one for Question No. 4.

The above-described operation of recording portion 10 is proper for recording a program to be used in the Test Mode and the Teach Mode Number 1. In case the program to be prepared is to be used for the Teach Mode No. 1, it has been found convenient to start the recorded program with a lecture which is then followed by questions and coded answers such as indicated at 40 and 41, FIG. 4A.

In case the program to be recorded is to be used for operation in the Teach Mode No. 2, the same procedure as outlined above is followed except that after recording the question 40 and the coded answer 41 as shown in FIG. 4B, and after a selected time interval has elapsed, additional coded pulses are recorded as shown at 44 in FIG. 4B. The number of additional pulses recorded depends on the number of coded pulses already on the tape (such as indicated at 41) and is selected to bring the total number of coded pulses to eight. The significance of a total count of successive pulses equals to eight will become better understood in connection with the description of FIG. 3.

For the proper operation of this invention it is necessary that there be a proper time interval between the commencement of the first group of pulses such as 41 and the commencement of the second group of pulses such as 44, FIG. 4B. The proper time interval must be greater than the time occupied by 9 consecutive code pulses so that the reproducing portion of this invention can function properly. The time interval is generally selected to be greater by at least 20 percent of the time occupied by maximum number of coded pulses which may be generated by coder 18 and which is shown by reference character T in FIG. 4B.

Coder 18 may incorporate a suitable time delay which is actuated automatically at the time the code pulses for the correct answer are actuated and which may light up a signal after the expiration of the selected time delay. As soon as the delay signal appears, the person recording the program may actuate the additional group of code pulses to bring the total number of code pulses to eight. Immediately following the eighth code pulse, as shown at 44, FIG. 4B, reinforcing material is introduced into microphone 12 for recording on tape 34, as indicated at 45. This reinforcing material is then immediately followed by an additional single pulse, shown at 46, which brings the total number of pulses following a question to nine.

Thereafter, the next question, Question 4, as shown at 42 is spoken into microphone 12 and coder 18 is actuated to provide the proper number of code pulses as shown at 43 just as was explained in connection with FIG. 4A. Coded pulse group 43 is followed by a single pulse 46 after the proper time interval to bring the total number of code pulses following Question No. 4 to eight as before. Thereafter, additional reinforcing material, indicated at 47 and relating to Question No. 4, is spoken into microphone 12. Reinforcing material 47 is followed by a single code pulse, indicated at 48, which brings the total number of code pulses following question 42 to nine. Thereafter Question No. 5 is recorded.

Referring now to FIG. 2 there is shown an alternate embodiment of a program recording portion 50 comprising a microphone 12, a coder 18, a code oscillator 22, and an AND gate 20 which may be alike in all respects to those shown and described in FIG. 1. A tape recorder 52 is provided, which differs from tape recorder 20 in that it includes two magnetic heads respectively designated as 53 and 54 for recording signals upon a tape 55 in customary manner.

The signal from microphone 12 is applied, through an amplifier 56, directly to magnetic head 54 and the gated code oscillator signal from AND gate 28 is applied, via an amplifier 57, to magnetic head 53. Basically, the operation of the program coding portion 50 of this invention is very similar to the one explained in connection with program coding portion 10. The main difference is that instead of a single channel, a dual channel device is made use of, thereby eliminating filter 14 and mixer 16 but adding an extra amplifier 57.

Referring now to FIG. 3, there is shown an illustrative embodiment of the teaching device of this invention suitable for operating in the three modes heretofore described. A tape transport, generally indicated as 64, includes a tape supply reel 65 and a take-up reel 66 for storing a tape 67 upon which the testing or teaching program has been recorded as described hereinabove. A magnetic head 68 for sensing the composite signal is connected to suitable output circuits and playback amplifiers which are generally indicated as 69. Tape 67 is driven past magnetic head 68 by means of a conventional tape drive, such as pinch rollers or other suitable means, which is indicated generally as 70. Tape transport 64 has an output lead 71 coupled to output circuits 69 for applying the composite output signal to the utilization devices to be described and an input lead 72 coupled to drive 70 for driving tape 67 in accordance with the operational program.

The composite signal is applied, via an output lead 71, a conventional AND gate 73, and a lead 74, to a loud speaker 75 or similar sound reproducing means such as earphones. The composite signal is also applied, via lead 71 to the input terminal of a band pass or high pass filter 76 which is constructed to eliminate the audio signal portion therefrom and to only pass the gated code oscillator signal. The gated code oscillator signal is applied, through lead 77, to a conventional trigger circuit 78 which may include an AM detector and a pulse shaper such as, for example, a conventional Schmidt trigger circuit. Trigger circuit 78 is triggered by the leading edge of each gated code oscillator signal pulse and is constructed to provide an output pulse of selected amplitude and duration for each coded oscillator signal pulse. The shaped output pulses from trigger 78 are applied via lead 79, to a decoder 80 and to a delay circuit 81.

Decoder 80 is basically a "serial to parallel" converter such as, for example, a conventional stepping switch which advances by one step with the application of each successive pulse. The particular coder 80, shown in FIG. 3, is provided with ten positions numbered consecutively from 0 to 9. As will become better understood hereinafter, the number of output positions of decoder 80 depends entirely on the particular logic and mode of operation desired and may be decreased or increased accordingly. Ten position decoder 80 is eminently suitable for operating the device of this invention in the Test Mode, Teach Mode No. 1 and Teach Mode No. 2. The various output positions of decoder 80 are designated by reference character 80 followed by a number indicative of the switch position.

Delay 81 may be selected in the form of a conventional monostable multivibrator which is triggered on the leading edge of the first shaped pulse applied and which returns to its quiescent position after a selected time interval. As has already been stated in connection with the explanation of Teach Mode No. 2, the commencement of the second group of pulses such as group 44, FIG. 4B must be delayed with respect to the commencement of the first group of pulses such as by an interval greater than nine consecutive pulses, i.e., an interval T. Accordingly, delay 81 is so set that it returns to its quiescent position after a period of time which is longer than that taken by 9 consecutive pulses in the embodiment shown, or generally, which is longer than the time necessary to advance decoder 80 to the last position. It has been found that, if a telephone dialer is used as a coder, a delay of about 1 second is entirely satisfactory.

Output lead 82 of delay 81 applies the trailing edge of the delayed pulse to the input circuit of a conventional AND gate 83, to decoder 80, and to the ON terminal of a memory device such as switch means 111. The delay pulse on lead 82 and gated by AND circuit 83 is applied, via gate output lead 84, to the OFF terminal of a switch means 85 connected via lead 72 to control tape drive 70. The delayed pulse applied to decoder 80 is also utilized to enable output circuits 1 to 9 of decoder 80 which is so constructed that prior to the application of the delayed pulse all output circuits except circuit 0 (home position) are disabled. One conventional method of such disabling means is to provide AND gates or the like in each coder output circuit except the first output circuit and utilize lead 82 as enabling signal lead.

Switch means 111, turned on by delay 81, has its output lead 112 connected to a lamp 113 on a response panel, indicated by broken line 120*a*, which shows that delay 81 has returned to its quiescent position and that a response may now be received.

Decoder output position 80–0, the home position, is connected to the input circuit of a conventional OR gate 96 whose output circuit is connected, via lead 98, to the input circuit of AND gate 73 and applies the enabling signal thereto. Decoder output position 80–8 is connected to the input circuit of a conventional AND gate 95 and also to the input circuit of a conventional OR gate 122. Decoder output position 80–9 is also connected to the input circuit of conventional OR gate 122 and to the input circuit of a conventional triple input OR gate 109 which in turn has an output circuit connected, via output lead 110, to the reset terminal of decoder 80 and which resets decoder 80 to its home position 80–0.

OR gate 122 has its output circuit connected, via a lead 104, to a conventional inverter 105. An inverter output lead 106 is connected to the input circuit of conventional AND gate 83 which applies its gated output signal to the OFF terminal of switch means 85. Decoder output position 80–1 is connected directly to a response panel lamp 114 on response panel 120*a* which lights up whenever decoder 80 comes to rest on this output position, an indication of the end of the tape and coded by a single gated code oscillation pulse. Decoder output position 80–2 is directly connected to a mask 118 covering the face of a correct counter 117 which retracts the mask whenever decoder 80 comes to rest in this output position and coded by two gated code oscillator pulses.

Decoder output positions 80–3, 80–4, 80–5, 80–6 and 80–7 are applied respectively to the input terminals of a comparator 123. Comparator 123 may take the form of a logic circuit which is responsive to the output position of decoder 80 and which compares certain input information, as will be explained, with the decoder position to provide output signals indicative of certain combinations.

There is also provided response circuit 120 which includes 5 response buttons 124, each one of which is associated with a different one of the multiple choice answers. Response circuit 120 is provided with five output leads 120–3, 120–4, 120–5, 120–6 and 120–7, each associated with a different response button 124 and each applied to the input terminals of comparator 80.

In the embodiment of this invention to be described, the presence of output signals on both comparator output leads 86 and 87 will have the same effect as an output signal on output lead 86 only since it takes precedence by actuating circuits which prevent the output signal on lead 87 from being acted upon. The reason for this is to prevent a student from cheating the machine by pushing more than one response button at the same time. The same effect could be realized by utilizing the output signal on line 86 to close a gate through which the output signal of lead 87 had to pass to the utilization circuits.

A suitable comparator 80 may include two toggles such as bistable multivibrators, one is set by the student as he depresses the response button corresponding to the correct answer and the other is set by the student if he depresses any response button other than the one corresponding to the correct answer. For example, if decoder output position 80–6 is high and response button 120–6 is depressed, the logic is arranged, by a matrix network or otherwise, to set one toggle. If any other response button is depressed, the other toggle is set to provide an output signal on lead 86. Such logical network is readily constructed from five diodes and a five input OR gate or by other conventional logic arrangement as well know to those skilled in the art.

Output line or lead 87 is applied to the input circuit of a conventional OR gate 88 and to the second switch terminals of a pair of ganged three-position mode switches respectively designated by reference mode switches 90 and 91 to determine the particular mode in which the device of this invention is to be operated, position 1 corresponding to the Teach Mode, position 2 corresponding to the Teach Mode No. 1, and position 3 corresponding to Teach Mode No.2.

Output line 86 is also connected to the input circuit of OR gate 88 and to the set terminal of a switch means 89 which may be of the form of a conventional bistable multivibrator and which is set by an incorrect answer. OR gate 88 has its output circuit connected, via output lead 92, to position 1 of mode switch 90 and to positions 1 and 3 of mode switch 91.

The output terminal of switch 90 is connected, through lead 99, to the input circuit of OR gate 109 and is utilized to apply a reset pulse to decoder 80. Output terminal of switch 91 is connected, through lead 100, to a total counter 119, to the input circuit of a conventional AND gate 115 and to the input circuit of conventional OR gate 107 to fulfill various operations which will hereinafter be explained.

A reset response panel button 102 is also connected, via lead 103, to the input circuit of OR gate 107. The output circuit of OR gate 107 is connected, via lead 108, to the ON terminal of switch means 85 and to the OFF terminal of switch means 111. Also, one of the output terminals of switch means 89 is connected via lead 93 to enable AND gate 115 whose output circuit is connected, through lead 116, to a correct counter 117. The other output terminal of switch means 89 which provides the complement is connected, via lead 94, to apply an enabling signal to AND gate 95.

The invention can be best understood by reference to the following description of its operation. As heretofore stated the device of FIG. 3 may be operated in one of three different modes designated respectively as the Test Mode, Teach Mode No. 1 and Teach Mode No. 2. Operation in the different modes is provided by means of switchiing mode switches 90 and 91 as heretofore stated.

Referring now to the operation of this invention common to all modes, decoder 80 is initially in the 80–0 position or home position so that lead 80–0 is high and applies an enabling signal, through OR gate 96 and lead 98 to AND gate 73. Accordingly, AND gate 73 is always open when decoder 80 is in its home position.

As soon as tape transport 64 is actuated, such as by depressing reset button 102 which turns on switch means 85 to start tape drive 70, tape 76 is advanced to provide an audio signal on tape recorder output lead such as diagrammatically indicated at 40, FIG. 4A. Since AND gate 73 is open at the instant, the audio signal passes to loud speaker 75 for audible reproduction. The audio signal is also applied to filter 76 which is constructed to prevent the same from passing therethrough to trigger 78.

After the introductory interval or question has been audibly reproduced, tape 67 continues to be driven past magnetic head 68 which now senses the gated code oscillator signals shown at 125. These coded signals are passed by filter 76 and applied to trigger 78 which forms the pulses shown at 126 from the leading edge of the code signals. Decoder 80 is so constructed that the leading edge of each pulse, such as the one shown at 126, advances the position of the decoder by one step. Accordingly, as soon as the leading edge of the first pulse of the group of pulses 126 is applied to decoder 80, it advances its position so that output position 80–0 immediately becomes low and thereby removes the gate enabling signal from lead 98 thereby closing gate 73 and preventing any of the code oscillator signals from reaching loud speaker 75. Of course at that time lead 80–8 and 94 are low also.

At the same time, the leading edge of the first pulse 126 is applied to delay means 81 to trigger the same. Since delay 81 is constructed to return to its normal position after a time T sufficient to permit at least 9 consecutive pulses to be received, no output signal is provided on decoder gating lead 82 until the end of the delay. Decoder 80 is, as has already been mentioned, so constructed that unless decoder enabling lead 82 is high no output signals are provided from the various decoder output circuits 1 to 9.

As soon as delay means 81 returns to its quiescent position, it provides an enabling signal on lead 82 opening output circuits 1 to 9 of decoder 80. At the same time it provides an output signal which is applied through AND gate 83 which is open through inverter 105 unless decoder 80 comes to rest either in position 8 or 9. Since, as hereinabove explained, positions 8 and 9 are only used in connection with operating the device of this invention in the Teach Mode No. 2, AND gate 83 is normally opened so that at the end of the delay period T, a signal is applied to switch means 85 which turns off tape drive 70.

The signal from delay 81 is also applied to switch means 111 turning the same on thereby actuating response panel lamp 113 which lights up to indicate to the student that he should now answer. In summary therefore, after the time determined by delay 81, decoder 80 has reached its final position, tape transport 64 is turned off, the decoder output circuits are enabled to set comparator 123 and switch 111 is turned on indicating that the student should now respond.

The hereinabove described operation of the device of FIG. 3 is common to all three modes of operation and puts this device in condition for the student to make a selection of the multiple choice answers. It might also be stated that in the particular embodiment presented in FIG. 3, the section position 80–1 of decoder 80 indicates the end of the tape which causes response panel lamp 114 to light up. The third position 80–2 of decoder 80 is reserved for removing mask 118 from the correct counter 117 and is usually provided just before the end of the tape is reached. The next five decoder positions 80–3, 80–4, 80–5, 80–6 and 80–7 are reserved for the coded answers. The two last decoder positions will be explained hereinafter.

Assuming that the proper answers to the question is *c*, i.e., the third choice of the multiple answer, the five code bursts would have advanced decoder 80 to the fifth position to enable the appropriate toggle in comparator

123 to be set by the third response button. Consequently, if the student presses the button which applies the signal to lead 120–5 he has a correct answer and generates a signal on lead 87. Any other response panel button will provide an incorrect answer to generate a signal on lead 86.

Referring now particularly to the Test Mode in which mode switches 90 and 91 are in their first position and assuming that a correct answer is given, this correct answer generates an output signal on lead 87 which is applied to OR gate 88 and passes therethrough to both switch output leads 99 and 100. Output lead 99 applies this signal through OR gate 109 and lead 110 to the reset terminal of decoder 80 to reset the same to its home position. The signal on output lead 100 is applied to total counter 119 which advances by one step and is also applied through AND gate 115 and 116 to correct counter 117 which advances by one step only if a correct response was made on the first try.

Correct counter gate 115 controls correct counter 117 in the following manner. Each reset pulse resets switch means 89 so that lead 93 is high and provides a gate enabling signal to AND gate 115. Every time an incorrect answer is given, switch means 89 is set to close gate 115. The signal on lead 100 is also applied, via OR gate 107 and output lead 108, to the OFF terminal of switch means 111 which turns off answer panel light 113 and to the ON terminal of switch means 85 which turns on tape drive 70 so that tape transport 64 can proceed to the next question.

In case that the student presses the incorrect response panel button 124, comparator 123 provides a signal on lead 86 which "sets" device 89 thereby closing AND gate 115 so that correct counter 117 cannot be advanced. The signal on 86 is also applied, through OR gate 88 and lead 92 to output leads 99 and 100 in the same manner as that of signal on lead 87. Consequently the signal on lead 86 likewise resets decoder 80, turns switch means 85 on, turns switch means 111 off, and advances to total counter 119. In other words, on an incorrect signal, the operation of the device of this invention is substantially the same as on a correct signal except that AND gate 117 is closed so that correct counter 117 is not advanced.

Operation of the device of this invention in Teach Mode No. 1 obtained by setting switches 90 and 91 to the second position, is as follows. As has been stated heretofore, the primary difference between operating in the Test Mode and this mode is that in the Test Mode, tape transport 64 is advanced after every question regardless of whether the answer is correct or incorrect. In the Teach Mode No. 1, tape transport 64 only advances after the correct answer is received. Total counter 114 advances every time a new question is asked but correct counter 117 advances only in case of a correct response on the first selection to the question.

The operation of this device in this mode is substantially the same as the one described in connection with the Test Mode up to the time that panel light 113 lights up to advise the student of the fact that the device is ready to receive his response. In case he gives the correct answer on the first selection a signal is applied, through comparator output line 87, directly to position 2 of both mode switches 90 and 91 just as before. This signal is received by conductors 99 and 100, just as was described in connection with the Test Mode, resets decoder 80, turns on switch means 85 and thereby transport 64, turns off switch means 111 and thereby answer light 113, and advances both counters 117 and 119.

If the student on his first selection selects the incorrect answer an output signal is provided on comparator line 86 which, because of switches 90 and 91 is not applied to leads 99 and 100. Instead the output signal is applied to the set terminal of switch means 89 to set the same so that line 93 becomes low which in turn closed AND gate 115 thereby isolating correct counter from any signal that might be applied subsequently to lead 100. Also, switch means 111 remains on thus leaving answer lamp 113 on indicating to the student that he is to answer again.

Nothing else happens from then on and any subsequent incorrect responses made by the student by depressing response panel buttons will have no effect on the system. Until the right answer is selected no signals will be applied to leads 99 and 100 to advance transport 64 to the next question and reset all the other switches in the circuit as well as turn off panel lamp 113. Also, since switch means 89 is in its set position closing gate 115, any subsequent correct answer will only advance total counter 119 but not correct counter 117.

Operation of the device of this invention in Teach Mode No. 2 is as follows. As heretofore stated, tape transport 64 restarts every time an answer is made regardless of whether the answer is correct or incorrect. However, instead of proceeding to the next question, special reinforcing material is given the student in case he selected the wrong answer. The coding scheme in connection with utilizing the devices of this invention in Teach Mode No. 2 has been explained in connection with the description of FIG. 4B. For operation in this mode, decoder 80 is provided with two additional positions which are position 8 and position 9.

As before, the operation in this mode is identical to the previously explained operation in the other mode up to the time that response panel lamp 113 lights up indicating to the student that the device is ready to receive his answer. If the student selects the correct answer, a signal is applied by comparator 123 to comparator output lead 87. Since switches 90 and 91 are set to the third position to operate in this mode the signal on lead 87 passes through OR gate 88, output lead 92 and through switch 91 to lead 100. No signal passes to lead 99 to initiate a reset.

The signal on lead 100 operates in exactly the same manner as previously described, that is, it advances total counter 119 and correct counter 117 through open AND gate 115. Furthermore, the signal is applied through OR gate 107 to shut off switch means 111 to extinguish panel light 113, and to turn on switch 85 to actuate tape transport drive 70 and to advance tape 67. Tape transport electronics 69 then receives a group of pulses such as 44 FIG. 4B which advance decoder 80 to the 8th position. The leading edge of the first pulse of code group 44 triggers delay 81 which masks or disables the several decoder output terminals until the end of the delay pulse throughout output lead 82. Also, the delay pulse is applied to AND gate 83 which, however, remains closed because at the same time output position 80–8 is enabled and since it is high and passes through inverter 105 it provides a disabling signal on lead 106 thereby closing AND gate 83. Accordingly, switch 85 is not turned off by delay 81.

Decoder position 80–8 also applies a gating signal to AND gate 95 which, however, remains closed since the gating signal on lead 94 is low because switch means 89 was not set since the correct answer was given. Accordingly, no enabling signal is passed through OR gate 96 to open AND gate 73. Consequently, reinforcing material 45, FIG. 4B which is applied to lead 71, is prevented from reaching speaker 75 by closed AND gate 73 and the student does not hear the reinforcing material.

After tape transport 64 advances and picks up pulse 46 FIG. 4B, decoder 80 is advanced to the 9th position and delay 81 is actuated once more. After the end of the delay period decoder output circuit 80–9 is enabled and high and passes through inverter 105 to close AND gate 83 so that the delayed pulse on output lead 82 does not turn off switch means 85 and stop tape transport 64. However, position 9 is also connected to OR gate 109 and will reset decoder 80 to return the same to its home or 80–0 position. Thereafter the next question is automatically asked the student.

If the student selects an incorrect answer on the first response a signal is applied to lead 86 which immediately sets switch means 89 to close AND gate 115 thereby isolating correct counter 117 until a reset. The signal on lead 86 is also applied to OR gate 88 in the same manner that the signal 87 was applied thereto. Accordingly, the signal on lead 86 will therefore advance the total counter 119, switch off switch means 111 and thereby the response panel lamp 113 and turn on switch 85 to advance tape transport 64 to the group of pulses designated 44 in FIG. 4B.

The operation of this device now continues substantially in the same manner as described hereinabove except that switch means 89 applies an enabling signal to output lead 94 which opens AND gate 95 and, through OR gate 96, applies an enabling signal via lead 98 to open AND gate 73. The only difference therefore is that when the reinforcing material is applied to lead 71 it will pass through open AND gate 73 and be audible through loud speaker 75. As soon as decoder 80 is advanced to its 9th position, it will also apply a reset signal along lead 110 to switch means 89 to reset the same for closing AND gate 95 and opening AND gate 115.

In case it is desired to use a slide projector for demonstrating exhibits illustrating a question, or for providing a visual multiple choice answer, the ninth pulse corresponding to the last decoder position may be used to advance the slide projector. In case of operation in the Test Mode or Teach Mode No. 1, the slide projector need not be triggered every time a new question is presented but may be selectively triggered after some but not after other questions.

The teaching device of FIG. 3 operates in the same manner when used with the dual track tape 55 of FIG. 2. In that case the audio signal is applied to lead 71 and the code oscillator is applied to lead 77 and filter 76 may be eliminated.

There has been described a new testing and teaching device operable in several different modes and a new method therefore. The teaching device may be used with a record member having both questions and coded answers recorded thereon and can be repeated numerous times. The device is fully automatic and foolproof so that testing and training requires no supervision.

It will be obvious to those skilled in the art that different operating modes may be utilized in practicing the present invention depending on the material taught and the person to be taught in operating the device of this invention in the Test Mode, it may be found desirable to precede the following question with a statement of the correct answer of the preceding question. In this manner the device in the Test Mode teaches the person as well since the student has responded to a question he will immediately know the correct answer whether he selected the same or not.

What is claimed is:

1. A teaching device for use with a record member having stored thereon a composite signal representing questions and the like in the form of an audio signal for verbal reproduction which alternates with answers in the form of a sequence of a selected number of code signals of a selected frequency, and in which the audio signal has removed therefrom at least a narrow frequency band centered about said selected frequency, said teaching device comprising:

composite signal reproducing means including a drive means for reproducing said composite signal stored upon said record member when said drive means advances said record member;

gating means for gating said composite signal;

filter means for removing said audio signal from said composite signal;

speaker means responsive to said gated composite signal for audibly reproducing said audio signal;

delay means responsive to said filtered composite signal and operative to provide a delayed pulse after being triggered by the first code signal, the time delay between the first code signal and said delayed pulse being selected to exceed the time necessary to apply a sequence comprising the maximum number of code signals to said delay means;

drive switch means associated with said drive means and responsive to said delayed pulse, said drive switch means turning said drive means off in response to said delayed pulse;

serial decoder means responsive to said code signals of said filtered composite signal and operative to advance its output position by one step with each applied code signal, from a reset position, each position having an output terminal and the output terminal corresponding to output position providing a decoder output signal, the reset terminal being connected to open said gating means when said decoder means is in its reset position, said decoder means also including a reset means to return said decoder means to reset position;

response circuit means including a manual selector for selecting a response signal in accordance with a decoder output position, each selected response signal corresponding to a diffeent decoder output position;

comparator means responsive to said decoder output signal and said selected response signal and operative to provide a true output signal when the selected response signal corresponds to the decoder output position and a false output signal when the selected response signal does not correspond to the decoder output position, said reset means and said drive switch means being responsive to said true and said false output signal to reset said decoder and to turn on said drive means; and correct counter means responsive to said true output signal and operative to advance said correct counter means by one step.

2. A teaching device for use with a record member having stored thereon a composite signal representing questions and the like in the form of an audio signal for verbal reproduction which alternate with answers in the form of a sequence of a selected number of code signals of a selected frequency, and in which the audio signal has removed therefrom at least a narrow frequency band centered about said selected frequency, said teaching device comprising:

composite signal reproducing means including a controllable drive means for driving said record member past a sensor to reproduce the composite signal stored upon said record member when said drive means said record member past said sensor;

gating means for gating said composite signal;

speaker means responsive to said gated composite signal for audibly reproducing said audio signal;

frequency sensitive filter means for stripping said audio signal of said composite signal to transmit only said code signals of said selected frequency;

delay means responsive to the first code signal in a sequence and operative to provide a delayed pulse, the time delay between the first code signal and said delayed pulse being selected to exceed the time necessary to apply a sequence consisting of the maximum number of code signals to said delay means;

drive switch means associated with said drive means and responsive to said delayed pulse, said drive switch means turning said drive means off in response to said delayed pulse;

serial decoder means responsive to said code signals and operative to advance its output position by one step with each applied code signal from a reset position, each decoder position having an output terminal and the output terminal corresponding to output position providing a decoder output signal, the reset terminal being connected to open said gating means when said decoder means is in its reset position, said decoder means including output terminal enabling means responsive to said delayed pulse to apply said decoder output signal to the corresponding output terminal only at the end of said time delay, said decoder means also including a reset means to return said decoder means to its reset position;

response circuit means including a selector for selecting a response signal for association with certain decoder output positions, each selected response signal corresponding to a different decoder output position, said response circuit being actuatable by a student;

comparator means responsive to said decoder output signal and said selected response signal and operative to provide a true output signal when the selected response signal corresponds to the decoder output position and a false output signal when the selected response signal does not correspond to the decoder output position, said reset means and said drive switch means being responsive to said true and said false output signal to reset said decoder and to turn on said drive means; and correct counter means responsive only to said true output signal and operative to advance said correct counter means by one step.

3. A teaching device for use with a record member having stored thereon a composite signal representing questions and the like in the form of an audio signal for verbal reproduction which alternate with answers in the form of a sequence of a selected number of code signals at a selected frequency, and in which the audio signal has removed therefrom at least a narrow frequency band centered about said selected frequency, said teaching device comprising:

composite signal reproducing means including the record member, a sensor and controllable drive means for driving said record member past said sensor, said sensor being responsive to said composite signal stored upon said record member and operative to reproduce said composite signal when said drive means moves said record member past said sensor;

gating means responsive to a gating signal for gating said composite signal;

speaker means responsive to said gated composite signal for audibly reproducing said audio signal;

frequency sensitive filter means for stripping said audio signal from said composite signal to transmit only said code signals of said selected frequency;

trigger means responsive to said code signals and operative to provide a code pulse of a selected duration and amplitude in response to each code signal;

delay means responsive to the first code pulse in a sequence and operative to provide a delayed pulse, the time delay between the first code pulse and said delayed pulse being selected to exceed the time necessary to apply a sequence consisting of the maximum number of code pulses to said delay means;

drive switch means responsive to said delayed pulse for controlling said drive means, said switch means turning said drive means off in response ot said delayed pulse;

response lamp switch means responsive to said delayed pulse for turning on a response lamp to indicate readiness for receiving a response;

serial decoder means responsive to said code pulses and operative to advance its output position by one step with each applied code pulse from a reset position, each decoder position having an output terminal and the output terminal corresponding to output position providing a decoder output signal, the reset terminal being connected to open said gating means when said decoder means is in its reset position, said decoder means including output terminal enabling means responsive to said delayed pulse to apply said decoder output signal to the corresponding output terminal only at the end of said time delay, said decoder means also including a reset means to return said decoder means to its reset position;

response circuit means including a selector for selecting a response signal for association with certain decoder output positions, each selected response signal corresponding to a different decoder output position, said response circuit means being manually actuatable by a student;

comparator means responsive to said decoder output signal and said selected response signal and operative to provide a true output signal when the selected response signal corresponds to the decoder output position and a false output signal when the selected response signal does not correspond to the decoder output position, said reset means, said response lamp switch means, and said drive switch means being responsive to said true and said false output signal to reset said decoder means, to turn off said response lamp and to turn on said drive means; and correct counter means responsive to said true output signal and operative to advance said correct counter means by one step.

4. A teaching device for use with a record member having stored thereon a composite signal representing questions and the like in the form of an audio signal for verbal reproduction which alternate with answers in the form of a sequence of a selected number of code signals at a selected frequency, and in which the audio signal has removed therefrom at least a narrow frequency band centered about said selected frequency, said teaching device comprising:

composite signal reproducing means including, the record member, a sensor having an electronic output circuit, and drive means for driving said record member past said sensor, said sensor being responsive to said composite signal stored upon said record member and operative to reproduce said composite signal when said drive means moves said record member past said sensor;

gating means responsive to a gating signal for gating said composite signal;

speaker means responsive to said gated composite signal for audibly reproducing said audio signal;

frequency sensitive filter means responsive to said composite signal and operative to transmit only signals of said selected frequency thereby removing said audio signals from said composite signal leaving said code signals;

trigger means responsive to said code signals and operative to provide a code pulse of a selected duration and amplitude in response to each code signal;

delay means responsive to the first code pulse in a sequence and operative to provide a delayed pulse, the time delay between the code pulse and said delayed pulse being selected to exceed the time necessary to apply a sequence, consisting of the maximum number of code pulses, to said delay means;

drive switch means associated with said drive means, said switch means being operative to turn said drive means off in response to said delayed pulse;

response lamp switch means responsive to said delayed pulse for turning on a response lamp to indicate readiness for receiving a student's response;

serial decoder means responsive to said sequence of code pulses and operative to advance its output position by one step with each successively applied code pulse from a reset position, each position having an output terminal and the output terminal corresponding to output position of said decoder means providing a decoder output signal, the reset terminal being connected to open said gating means when said decoder means is in its reset position, said decoder means including output terminal enabling means responsive to said delayed pulse to apply said decoder output signal to the corresponding output terminal at the end of said time delay, said decoder means also including a reset means to return said decoder means to its reset position;

response circuit means including a selector for selecting a response signal, each selected response signal corresponding to a different decoder output position, said response circuit means being actuatable by a student;

comparator means responsive to said decoder output signal and said selected response signal and operative to provide a true output signal when the selected response signal corresponds to the decoder output position and a false output signal when the selected response signal does not correspond to the decoder output position, said reset means, said response lamp switch means, and said drive switch means being responsive to said true and said false output signal to reset said decoder means, to turn off said response lamp and to turn on said drive means;

correct counter means responsive to said true output signal and operative to advance said correct counter means by one step; and total counter means responsive to said true and said false output signal and operative to advance its position in response thereto.

5. A teaching device for use with a record member having stored thereon a composite signal representing questions and the like in the form of an audio signal for verbal reproduction which alternate with answers or the like in the form of a sequence of a selected number of code signals at a selected frequency, and in which the audio signal has removed therefrom at least a narrow frequency band centered about said selected frequency, said teaching device comprising:

composite signal reproducing means including, the record member, a sensor, and drive means for driving said record member past said sensor, said sensor reproducing the composite signal when said drive means moves said record member past said sensor;

gating means responsive to a gating signal for gating said composite signal;

speaker means responsive to said gated composite signal for audibly reproducing said audio signal;

filter means for stripping said audio signal from said composite signal leaving said code signals;

delay means responsive to the first code signal in a sequence and operative to provide a delayed pulse, the time delay between the code signal and said delayed pulse being selected to excess the time necessary to apply a sequence consisting of the maximum number of code signals to said delay means;

drive switch means associated with said drive means, said drive switch means being operative to turn said drive means and responsive to said delayed pulse off in response to said delayed pulse;

serial decoder means responsive to said sequence of code signals and operative to advance its output position by one step with each applied code signal from a reset position, each output position having an output terminal and the output terminal corresponding to actual output position of said decoder means providing a decoder output signal, the reset terminal providing said gating signal when said decoder means is in its reset position, said decoder means also including a reset means to return said decoder means to its reset position;

response circuit means including a selector for selecting a response signal, each selected response signal corresponding to a different decoder output position, said response circuit means being manually actuatable;

comparator means responsive to said decoder output signal and said selected response signal and operative to provide a true output signal when the selected response signal corresponds to the decoder output position and a false output signal when the selected response signal does not correspond to the decoder output position, said reset means and said drive switch means being responsive to said true output signal to reset said decoder means and to turn on said drive means;

false answer switch means responsive to said false and said true output signal, said false output signal setting said false answer switch means, and said true output signal resetting said false answer switch means;

further gating means for gating said true output signal said gating means being responsive to said false answer switch means to block said true output signal when said false answer switch means is set; and correct counter means responsive to said gated true output signal and operative to advance said correct counter means by one step.

6. A teaching device for use with a record member having stored thereon a composite signal representing questions or the like in the form of an audio signal for verbal reproduction which alternate with answers or the like in the form of a sequence of a selected number of code signals at a selected frequency, and in which the audio signal has removed therefrom at least a narrow frequency band centered about said selected frequency, said teaching device comprising:

composite signal reproducing means including the record member, a sensor, and drive means for driving said record member past said sensor, said sensor being responsive to the composite signal stored upon said record member and operative to reproduce the composite signal stored upon said record member when said drive means moves said record member past said sensor;

gating means responsive to a gating signal for gating said composite signal;

speaker means responsive to said gated composite signal for audibly reproducing said audio signal;

frequency sensitive filter means responsive to said composite signal and operative to transmit only signals of said selected frequency thereby removing said audio signal from said composite signal leaving said code signals;

trigger means responsive to said code signals and operative to provide a code pulse of a selected duration and amplitude in response to each code signal;

delay means responsive to the first code pulse in a sequence and operative to provide a delayed pulse, the time delay between the code pulse and said delayed pulse being selected to exceed the time necessary to apply a sequence consisting of the maximum number of code pulses to said delay means;

drive switch means associated with said drive means and responsive to said delayed pulse, said drive switch means being operative to turn said drive means off in response to said delayed pulse;

response lamp switch means responsive to said delayed pulse for turning on a response lamp to indicate readiness for receiving a response;

serial decoder means responsive to said sequence of code pulses and operative to advance its output position by one step with each applied code pulse from a reset position, each decoder position having an output terminal and the output position terminal corresponding to output position of said decoder means providing a decoder output signal, the reset position terminal providing said gating signal to open said gating means when said decoder means is in its reset position, said decoder means including output posilayed pulse to apply said decoder output signal to tion terminal enabling means responsive to said dethe corresponding output position terminal at the end of said time delay, said decoder means also including a reset means to return said decoder means to its reset position;

response circuit means including a selector for selecting a response signal, each selected response signal corresponding to a different decoder output position, said response circuit means being manually actuatable;

comparator means responsive to said decoder output signal and said selected response signal and operative to provide a true output signal when the selected response signal corresponds to the decoder output position and a false output signal when the selected response signal does not correspond to the decoder output position, said reset means, said response lamp switch means, and said drive switch means being responsive to said true output signal to reset said decoder means, to turn off said response lamp and to turn on said drive means;

false answer switch means responsive to said false output signal and said true output signal, said false output signal setting said false answer switch means and said true output signal resetting said false answer switch means;

further gating means for gating said true output signal, said gating means being responsive to said false answer switch means to block said true output signal when said false answer switch means is set;

correct counter means responsive to said gated true output signal and operative to advance said correct counter means by one step; and total counter means responsive to said true output signal and operative to advance said total counter means.

7. A teaching device for use with a record member having stored thereon a composite signal representing questions in the form of an audio signal for verbal reproduction followed by answers in the form of a sequence of a selected number of code signals, followed by further code signals which brings the total number of code signals to a predetermined number, followed by reinforcing material in the form of an audio signal followed by a still further code signal, said code signals being pulsed signals of a selected frequency and said audio signal having removed therefrom at least a narrow frequency band centered about said selected frequency, said teaching device comprising:

composite signal reproducing means for reproducing said composite signal from the record member, said reproducing means including a drive means for driving said record member past a sensor;

gating means responsive to a gating signal for gating said composite signal to provide a gated composite signal;

speaker means responsive to said gated composite signal for audibly reproducing said gated composite signal;

filter means responsive to said composite signal and operative to strip from said composite signal said audio signal and transmitting only said code signals;

trigger means responsive to the code signals of said filtered composite signal and operative to provide a code pulse of a selected amplitude in response to each code signal;

delay means responsive to the first code pulse in a sequence and operative to provide a delayed pulse, the time delay between the code pulse and said delayed pulse being selected to exceed the time necessary to apply a sequence consisting of the maximum number of code pulses in a sequence to said delay means;

drive switch means responsive to said delayed pulse associated with said drive means, said drive switch means being turned off in response to said delayed pulse;

response lamp switch means responsive to said delayed pulse for turning on a response lamp to indicate readiness for receiving a response;

serial decoder means responsive to said sequence of code pulses and operative to advance its output position by one step with each applied code pulse from a reset position, each decoder position having an output terminal and the output terminal corresponding to output position of said decoder means providing a decoder output signal, the decoder output signal from said reset terminal providing said gating signal when said decoder is in said reset position, said decoder means including output terminal enabling means responsive to said delayed pulse to apply said decoder output signal to the corresponding output terminal at the end of said time delay, said decoder means also including a reset means to return said decoder means to said reset position;

response circuit means including a selector for selecting a response signal, each selected response signal corresponding to a different decoder output position, said response circuit means being manually actuatable;

comparator means responsive to said decoder output signal and said selected response signal and operative to provide a true output signal when the selected response signal corresponds to the decoder output position and a false output signal when the selected response signal does not correspond to the decoder output position, said true and said false output signal turning off said response lamp switch means;

false answer switch means responsive to said false and said true output signal, said false output signal setting said false answer switch means to a first position;

further gating means for gating said true output signal, said gating means being responsive to the position of said false answer switch means to block said true output signal when said false answer switch is in said first position;

correct counter means responsive to said gated true output signal and operative to advance said correct counter means by one step;

total counter means responsive to said true and said false output signal and operative to advance said total counter means, said drive means being turned on in response to said true and said false output signal to advance the record member for applying said further code signal to said decoder means and to thereby advance said decoder means to a predetermined position corresponding to said predetermined number of code signals; and delayed pulse gating means interposed between said delay means and said drive switch means and gated by the decoder output signal from said predetermined output position terminal which closes said delayed pulse gate, said last mentioned decoder output signal also opening said gating means for gating said composite signal if said false answer switch means is set to said first position to audibly reproduce said reinforcing material from said record member, said reset means being responsive to said still further code pulse to reset said decoder means, said false answer switch means and to open said delayed pulse gating means.

8. A method of testing and teaching in which a person is audibly interrogated with questions and manually selects after each question an answer from a set of visually displayed multiple choice answers, said method comprising the steps of:

recording the questions upon a record member in the form of audio signals;

recording an answer upon the record member following each question in the form of a sequence of pulsed signals, the number of pulsed signals in the sequence being keyed to the correct answer of the set of multiple choice answers;

reproducing the recorded material from the record member to derive a composite signal consisting of said audio signals each followed by said pulsed signals;

filtering said composite signal to strip said audio signals from said composite signal to develop a filtered signal consisting of said pulse signals;

applying the composite signal to a loudspeaker means for audible interrogation of the person;

deriving a delayed pulse from the first pulse of each sequence of pulsed signals which is delayed for a selected time period which is sufficiently long to permit reception of the largest possible sequence of pulsed signals;

applying the sequence of pulsed signals to a decoder means which develops a decoded output signal during said selected time period indicative of the number of pulsed signals in a sequence;

utilizing said delayed pulse to discontinue reproducing the recorded material from said record member;

providing a manual selector means for operation by the person to derive a selected output signal indicative of a selected answer; and comparing the decoder output signal and the selected output signal to derive a true signal if the selected output signal corresponds to the decoder output signal and a false signal if the selected output signal does not correspond to the decoder output signal.

9. A method of testing and teaching in which a person is audibly interrogated with questions and manually selects after each question an answer from a set of visually displayed multiple choice answers, said method comprising the steps of;

recording the questions upon a record member in the form of audio signals;

recording an answer upon the record member following each question in the form of a sequence of pulsed signals at said selected frequency, the number of pulsed signals in the sequence being keyed to the correct answer of the set of multiple choice answers;

reproducing the recorded material from the record member to derive a composite signal consisting of said audio signals each followed by said pulsed signals;

filtering said composite signal to strip said audio signals from said composite signal to develop a filtered signal consisting of said pulse signals;

gating said composite signal with a gating signal which is removed by the first pulse of each sequence of pulsed signals to block transmission of the pulsed signals;

applying the gated composite signal to a loudspeaker means for audible interrogation of the person;

deriving a delayed pulse from the first pulse of each sequence of pulsed signals which is delayed for a selected time period which is sufficiently long to permit reception of the largest possible sequence of pulsed signals;

applying the sequence of pulsed signals to a decoder means which develops a decoded output signal during said selected time period indicative of the number of pulsed signals in a sequence;

utilizing said delayed pulse to discontinue reproducing the recorded material from said record member after said selected time period;

providing a manual selector means for operation by the person to derive a selected output signal indicative of a selected answer; and comparing the decoder output signal and the selected output signal to derive a true signal if the selected output signal corresponds to the decoder output signal and a false signal if the selected output signal does not correspond to the decoder output signal.

10. A method of testing and teaching in which a person is audibly interrogated with questions and manually selects after each question an answer from a set of visually displayed multiple choice answers, said method comprising the steps of:

recording the questions upon a record member in the form of audio signals from which at least a narrow band of frequencies centered about a selected frequency has been eliminated;

recording an answer upon the record member following each question in the form of a sequence of pulsed signals at said selected frequency, the number of pulsed signals in the sequence being keyed to the correct answer of the set of multiple choice answers and the time period between the first pulsed signal of an answer and the next question being selected to be greater than a selected time period;

reproducing the recorded material from the record member to derive a composite signal consisting of said audio signals each followed by said pulsed signals;

filtering said composite signal to strip said audio signals from said composite signal to develop a filtered signal consisting of said pulse signals;

gating said composite signal with a gating signal which is removed by the first pulse of each sequence of pulsed signals to block transmission of the pulsed signals;

applying the gated composite signal to a loudspeaker means for audible interrogation of the person;

deriving a delayed pulse from the first pulse of each sequence of pulsed signals which is delayed for said selected time period which is sufficiently long to permit reception of the largest possible sequence of pulsed signals;

applying the sequence of pulsed signals to a decoder means which develops a decoded output signal during said selected time period indicative of the number of pulsed signals in a sequence;

utilizing said delayed pulse to discontinue reproducing the recorded material by stopping said record member and to indicate that it is time for selecting an answer after said selected time period;

providing a manual selector means for operation by the person to derive a selected output signal indicative of a selected answer; and comparing the decoder output signal and the selected output signal to derive a true signal if the selected output signal corresopnds to the decoder output siganl and a false signal if the selected output signal does not correspond to the decoder output signal.

11. A method of testing and teaching in accordance with claim 10 which includes the further steps of:

utilizing the true and the false signal to commence reproduction of the recorded material, to extinguish the indication that it is time for selecting an answer, and to record the fact that an answer was selected; and utilizing the true signal to record the fact that a correct answer was made for scoring.

12. A method of testing and teaching in accordance with claim 10 which includes the steps of:

utilizing the true signal to commence reproduction of the recorded material, to extinguish the indication that it is time for selecting an answer, to record the fact that an answer was selected and to record the fact that a correct answer was made on the first selection for scoring; and utilizing said false signal to set a memory device to block the subsequent transmission of a true signal to prevent recording that a correct answer was made.

13. A method of testing and teaching in accordance with claim 10 which includes the steps of:

recording a further sequence of pulsed signals upon the record member following each sequence of pulses to bring the total number of pulsed sginals in said sequence and said further sequence to a predetermined number of pulsed signals;

recording reinforcing material upon the record member following each further sequence of pulsed signals in the form of audio signals from which at least a narrow band of frequencies centered about said selected frequency has been eliminated;

utilizing both said true and said false signals to commence reproduction of the recorded material, to extinguish the indication that it is time for selecting an answer, and to record the fact than an answer was made;

utilizing said false signal to open the gate for passing said composite signal to said loudspeaker means so that the reinforcing material is audibly reprodued; and utilizing said true signal to record the fact that a correct answer made from scoring.

14. A method of testing and teaching in accordance with claim 10 which includes the steps of:

recording a further sequence of pulsed signals upon the record member following each sequence of pulses to bring the total number of pulsed signals in said sequence and said further sequence to a predetermined number of pulsed signals, the separation between the first pulsed signal of said sequence and said further sequence being greater than said selected time period;

recording reinforcing material upon the record member following each further sequence of pulsed signals in the form of audio signals from which at least a narrow band of frequencies centered about said selected frequency has been eliminated, the separation between the first pulsed signal of said further sequence and said reinforcing material being greater than said selected time period;

recording a single pulsed signal upon the record member following each reinforcing material, the separation between said single pulse and the question immediately following being greater than said selected timed period;

utilizing both said true and said false signal to commence reproduction of the recorded material, to extinguish the indication that it is time for selecting an answer, and to record the fact that an answer was made;

utilizing said false signal to open the gate for passing said composite signal to said loudspeaker means so that the reinforcing material is audibly reproduced;

utilizing said true signal to record the fact that a correct answer was made for scoring; and utilizing a signal corresponding to said single pulse as the starting signal for the next question.

15. A method of testing and teaching in which a person is audibly interrogated with questions and manually selects after each question an answer from a set of visually displayed multiple choice answers, said method comprising the steps of:

reproducing recorded material from a record member to derive a composite signal consisting of audio signals representing said questions each of which is followed by a sequence of pulsed signals representing coded answers to the questions;

filtering said composite signal to strip said audio signals from said composite signal to develop a filtered signal comprising said pulse signals;

gating said composite signal with a gating signal which is removed by the first pulse of each sequence of pulsed signals to block transmission of the pulsed signals;

applying the gated composite signal to a loudspeaker means for audible interrogation of the person;

deriving a delayed pulse from the first pulse of each sequence of pulsed signals which is delayed for a selected time period which is sufficiently great to permit reception of the largest possible sequence of pulsed signals;

applying the sequence of pulsed signals to a decoder means which develops a decoded output signal during said selected time period indicative of the number of pulsed signals in a sequence;

utilizing said delayed pulse to discontinue reproducing the recorded material from said record member after said selected time period;

providing a manual selector means for operation by the person to derive a selected output signal indicative of a selected answer; and comparing the decoder output signal and the selected output signal to derive a true signal if the selected output signal corresponds to the decoder output signal and a false signal if the selected output signal does not correspond to the decoder output signal.

16. A testing and teaching system for audibly interrogating a person with a question in response to which the person selects, after each question, an answer from a set of multiple choice answers, said testing and teaching system comprising:

(a) means for recording the questions upon a record member in the form of audio signals from which a narrow band of frequencies centered about a selected frequency have been removed;

(b) means for recording an answer upon the record member immediately following each question in the form of a sequence of pulsed signals of said selected frequency, the number of pulsed signals in the sequence being keyed to the correct answer of the set of multiple choice answers;

(c) means for reproducing the recorded material from the record member to derive a composite signal consisting of said audio signals followed by said pulsed signals;

(d) bandpass means for filtering said composite signal to develop a filtered signal consisting of said pulse signals;

(e) loudspeaker means responsive to said composite signal for audible interrogation of the person;

(f) means for deriving a delayed pulse from the first pulsed signal of each sequence of pulsed signals;

(g) decoder means responsive to said filtered signal and operative to develop a decoded output signal;

(h) means utilizing said delayed pulse to discontinue reproducing the recorded material from said record member;

(i) selector means for operation by the person to derive a selected output signal indicative of a selected answer; and (j) means for comparing said decoder output signal and said selected output signal to derive an indication of whether the person selected the correct answer.

17. A testing and teaching system for audibly interrogating a person with a question in response to which the person selects, after each question, an answer from a set of multiple choice answers, said testing and teaching system comprising:

(a) means for recording the questions upon a record member in the form of audio signals from which a narrow band of frequencies centered about a selected frequency has been removed;

(b) means for recording an answer upon the record member immediately following each question in the form of a sequence of pulsed signals of said selected frequency, the number of pulsed signals in the sequence being keyed to the correct answer of the set of multiple choice answers;

(c) means for reproducing the recorded material from the record member to derive a composite signal consisting of said audio signals followed by said pulsed signals;

(d) means for filtering said composite signal to strip said audio signals from said composite signal to develop a filtered signal consisting of said pulsed signals;

(e) loudspeaker means responsive to said composite signal for audible interrogation of the person;

(f) means for deriving a delayed pulse from the first pulsed signal of each sequence of pulsed signals which is delayed for a selected time period which is sufficiently long to permit reception of the largest possible sequence of pulsed signals;

(g) decoder means responsive to said filtered signal for developing a decoded output signal indicative of the number of pulsed signals in a sequence;

(h) means utilizing said delayed pulse to discontinue reproducing the recorded material from said record member;

(i) selector means for operation by the person to derive a selected output signal indicative of a selected answer; and (j) means for comparing said decoder output signal and said selected output signal to derive a true signal when said selected output signal corresponds to said decoder output signal and a false signal when said selected output signal does not correspond to said decoder output signals.

18. A testing and teaching system in accordance with claim 17 in which said means for reproducing the recorded material includes a tape deck having a tape drive means and in which said tape drive means is responsive to said delayed pulse to deactivate said drive means.

19. A testing and teaching means in accordance with claim 17 in which said means for applying the composite signal to said loudspeaker means including a gating means response to the first pulsed signal in each sequence.

20. A testing and teaching system in accordance with claim 17 which includes means responsive to said true signal and said false signal which is operative to initiate a preselected program in accordance with the particular signal received.

21. A teaching device for use with a record member having recorded thereon, in succession, questions or instructional material or the like in the form of audio signals for aural representation and sequences of individual trigger pulses whose number does not exceed a predetermined maximum number and represents, in part, a desired response to the preceding aural representation in coded form, said teaching device comprising:

record member utilization means including drive means for advancing said record member and transducing means for said audio signals and said trigger pulses;

means responsive to said audio signals for aurally reproducing the same;

code pulse counting means responsive to said trigger pulses and operative to advance its output position by one step with each trigger pulse in a sequence;

delay means responsive to a preselected trigger pulse in a sequence and operative to provide a delayed pulse, the time delay between said preselected trigger pulse and the occurrence of said delayed pulse being constant and exceeding the time necessary for said drive means to advance said record member the necessary distance to pass the last trigger pulse in a sequence containing said maximum number past said transducing means;

means responsive to said delayed pulse and operative to stop said drive means;

response selection means for actuation by an individual operator in response to the aurally reproduced material, said selection means having a different position for each position of said counting means which corresponds to a response in coded form; and comparing means responsive to the position of said counting means and said selection means and operative to derive a true or false signal depending on whether the positions of said selection means and said counting means coincide or do not coincide.

22. A teaching device in accordance with claim 21 in which said audio signals and said trigger signals occupy the same track on said record member.

23. A teaching device in accordance with claim 21 in which said audio signals occupy one track and said trigger pulses occupy another track on said record member.

24. A teaching device in accordance with claim 21 in which said audio signals and said trigger signals occupy the same track on said record member and in which said trigger pulses comprise short bursts of a selected audio frequency missing from said audio signals which bursts are of substantially equal duration.

25. A teaching device in accordance with claim 24 in which a band pass filtering means having a pass band centered about said selected frequency is utilized to separate the transduced audio signals and trigger pulses.

26. A teaching device in accordance with claim 21 which further includes a gating means for said audio signals, said gating means being responsive to a selected trigger pulse.

27. A teaching device in accordance with claim 21 which further includes a logical memory responsive to said delayed pulse and operative to initiate an indication that the response selector means is ready for actuation.

28. A teaching device in accordance with claim 21 which further includes counter means responsive to said true signal.

29. A teaching device in accordance with claim 21 which further includes true counter means responsive to said true signal and a total counter means responsive to said true and said false signal.

30. A teaching device in accordance with claim 21 in which said comparing means includes a matrix network and in which said response selection means generates a signal which is applied to one side of said matrix network.

31. A teaching device in accordance with claim 21 which includes a reset means which is responsive to said true signal and said false signal and which is operative to start said drive means to reset said code pulse counting means.

32. A method of testing and teaching in which a person is audibly interrogated with questions and manually selects after each question an answer from a set of visually displayed multiple choice answers, said method comprising the steps of:

recording the questions upon a record member in the form of an audio signal;

recording an answer upon the record member following each question in the form of a sequence of pulsed signals, the number of pulsed signals in the sequence being keyed to the correct answer of the set of multiple choice answers;

reproducing the recorded material from the record member to derive the audio signal and the pulsed signals;

applying the audio signal to a loudspeaker means for audible interrogation of the person;

deriving a delayed pulse from the first pulse of each sequence of pulsed signals which is delayed for a selected time period which is sufficiently long to permit reception of the largest possible sequence of pulsed signals;

applying the sequence of pulsed signals to a decoder means which develops a decoded output signal during said selected time period indicative of the number of pulsed signals in a sequence;

utilizing said delayed pulse to discontinue reproducing the recorded material from said record member;

providing a manual selector means for operation by the person to derive a selected output signal indicative of a selected answer; and comparing the decoder output signal and the selected output signal to derive a true signal if the selected output signal corresponds to the decoder output signal and a false signal if the selected output signal does not correspond to the decoder output signal.

References Cited by the Examiner

UNITED STATES PATENTS

| | | | |
|---|---|---|---|
| 2,578,133 | 12/51 | Hawkins | 346—33 |
| 2,921,385 | 1/60 | Hamilton | 35—9 |
| 2,950,352 | 8/60 | Belck | 179—100.2 |
| 2,965,720 | 12/60 | Bumstead et al. | 179—100.1 |
| 2,965,975 | 12/60 | Briggs | 35—9 |
| 3,004,104 | 10/61 | Hembrooke | 179—100.2 |
| 3,009,025 | 11/61 | Takayanagi | 179—100.2 |
| 3,029,316 | 4/62 | Fine | 179—100.2 |
| 3,141,243 | 7/64 | Chapman et al. | 35—9 |

FOREIGN PATENTS

| | | |
|---|---|---|
| 763,341 | 12/56 | Great Britain. |
| 766,434 | 1/57 | Great Britain. |

ENGENE R. CAPOZIO, *Primary Examiner.*

GEORGE A. NINAS, Jr., JEROME SCHNALL, *Examiners.*